(12) United States Patent
Schurmans et al.

(10) Patent No.: US 11,314,030 B2
(45) Date of Patent: Apr. 26, 2022

(54) CABLE FIXATION DEVICES AND METHODS

(71) Applicant: COMMSCOPE CONNECTIVITY BELGIUM BVBA, Kessel-Lo (BE)

(72) Inventors: Eric Schurmans, Hogen-Geetbets (BE); Maarten Aerts, Kessel-Lo (BE); Karel VanWinkel, Tielt-Winge (BE); Frank De Blick, Tielt-Winge (BE); Johan Geens, Bunsbeek (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 0 days.

(21) Appl. No.: 16/755,066

(22) PCT Filed: Oct. 9, 2018

(86) PCT No.: PCT/EP2018/077486
§ 371 (c)(1),
(2) Date: Apr. 9, 2020

(87) PCT Pub. No.: WO2019/072852
PCT Pub. Date: Apr. 18, 2019

(65) Prior Publication Data
US 2020/0310062 A1 Oct. 1, 2020

Related U.S. Application Data

(60) Provisional application No. 62/569,878, filed on Oct. 9, 2017, provisional application No. 62/638,510, filed on Mar. 5, 2018.

(51) Int. Cl.
*G02B 6/44* (2006.01)
*H02G 3/32* (2006.01)

(52) U.S. Cl.
CPC ......... *G02B 6/4477* (2013.01); *G02B 6/4432* (2013.01); *G02B 6/4471* (2013.01);
(Continued)

(58) Field of Classification Search
CPC .. G02B 6/4432; G02B 6/4452; G02B 6/4471; G02B 6/4477; G02B 6/4478; H02G 3/32
See application file for complete search history.

(56) References Cited

U.S. PATENT DOCUMENTS 4,679,896 A   7/1987 Krafcik et al.
5,280,556 A   1/1994 Jones
(Continued)

FOREIGN PATENT DOCUMENTS

DE   37 24 977 A1   2/1989
EP   1 168 018 A2   1/2002
(Continued)

OTHER PUBLICATIONS

International Search Report and Written Opinion of the International Searching Authority for International Patent Application No. PCT/EP2018/077486 dated Jan. 21, 2019, 19 pages.
(Continued)

*Primary Examiner* — Ryan A Lepisto
(74) *Attorney, Agent, or Firm* — Merchant & Gould P.C.

(57) ABSTRACT

A cable fixation bracket and methods for securing cables to a cable fixation bracket are disclosed. The cable fixation bracket can include a base portion extending between a pair of mounting structures. A plurality of t-shaped cable fixation projections extending orthogonally from the base portion can be provided, each of which is configured to support a cable and to accept a cable tie. In some examples, the fixation projections are tapered. The cable fixation bracket can also include a bridge portion supporting a plurality of bracket structures for anchoring aramid yarn of the cables.

(Continued)

The bracket structures are configured such that aramid yarn of the cables can be wrapped around the bracket structures and returned to the fixation projections or such that the aramid yarn can be wrapped about a termination unit with the termination unit being mounted between a pair of adjacent cable structures.

25 Claims, 15 Drawing Sheets

(52) U.S. Cl.
CPC .......... *G02B 6/4452* (2013.01); *G02B 6/4478* (2013.01); *H02G 3/32* (2013.01)

(56) References Cited

U.S. PATENT DOCUMENTS

| | | | |
|---|---|---|---|
| 5,655,044 A | 8/1997 | Finzel et al. | |
| 6,489,565 B1 * | 12/2002 | Krietzman | H02G 3/045 174/101 |
| 6,539,161 B2 * | 3/2003 | Holman | G02B 6/4452 385/136 |
| 6,591,054 B2 | 7/2003 | Afflerbaugh et al. | |
| 7,460,757 B2 | 12/2008 | Hoehne et al. | |
| 8,620,128 B2 * | 12/2013 | Holmberg | G02B 6/4471 385/135 |
| 8,864,086 B2 * | 10/2014 | Sutherland | H02G 3/32 248/74.3 |
| 9,213,161 B2 * | 12/2015 | Cote | G02B 6/4452 |
| 10,436,999 B2 * | 10/2019 | Amaya Cruz | G02B 6/4477 |
| 10,520,695 B2 | 12/2019 | Jaksons et al. | |
| 11,073,673 B2 | 7/2021 | Jaksons et al. | |
| 2010/0054688 A1 | 3/2010 | Mullaney et al. | |
| 2010/0054689 A1 | 3/2010 | Mullaney et al. | |
| 2010/0092147 A1 | 4/2010 | Desard et al. | |
| 2011/0026894 A1 | 2/2011 | Rudenick et al. | |
| 2012/0318933 A1 | 12/2012 | Kimbrell et al. | |
| 2016/0134092 A1 * | 5/2016 | Bonvallat | F16L 3/1222 248/68.1 |

FOREIGN PATENT DOCUMENTS

| | | | |
|---|---|---|---|
| EP | 2 148 231 A1 | 1/2010 | |
| EP | 2 482 108 A1 | 8/2012 | |
| JP | 3-034788 B2 | 4/2000 | |
| WO | 00/72072 A1 | 11/2000 | |
| WO | 2013/117484 A2 | 8/2013 | |
| WO | 2015/091865 A2 | 6/2015 | |
| WO | WO-2015091865 A2 * | 6/2015 | .......... G02B 6/4471 |
| WO | 2017/114936 A1 | 7/2017 | |
| WO | 2017/156537 A1 | 9/2017 | |

OTHER PUBLICATIONS

International Search Report for PCT Patent Application No. PCT/EP2014/078571 dated Oct. 14, 2015, 6 pages.

* cited by examiner

CABLE FIXATION DEVICES AND METHODS

CROSS-REFERENCE TO RELATED APPLICATIONS

This application is a National Stage Application of PCT/EP2018/077486, filed on Oct. 9, 2018, which claims the benefit of U.S. Patent Application Ser. No. 62/569,878, filed on Oct. 9, 2017, and claims the benefit of U.S. Patent Application Ser. No. 62/638,510, filed on Mar. 5, 2018, the disclosures of which are incorporated herein by reference in their entireties. To the extent appropriate, a claim of priority is made to each of the above disclosed applications.

BACKGROUND

Telecommunications systems such as fiber optic communications systems are becoming prevalent in part because service providers want to delivery high band width communication capabilities to customers. Fiber optic communications systems employ a network of fiber optic cables to transmit large volumes of data and voice signals over relatively long distances. Being part of a large fiber optic network, cables routed to and from telecommunications equipment may be exposed to pulling, pushing or rotational forces. It is desirable to provide effective cable fixation or termination for fiber optic cables that are secured or anchored to telecommunications equipment or fixtures to limit damage to optical fibers within the cables and/or connections within the telecommunications equipment.

SUMMARY

One aspect of the present invention relates to a stackable cable fixation device mountable to a base of telecommunications equipment having at least one upright projecting from the base.

In some examples, the cable fixation device includes a base portion extending between a first end and a second end and a plurality of t-shaped cable fixation projections extending orthogonally from the base portion, each of the cable fixation projections being configured to support a cable.

In some examples, the cable fixation projections include an extension portion and a head portion, wherein the extension portion tapers to have a decreased dimension in a direction from the base portion towards the head portion.

In some implementations, the extension portion tapers in a widthwise direction and/or tapers to have a decreasing thickness.

In some examples, each of the plurality of fixation projections includes one or more first rib projections for increasing frictional resistance with the cable in a direction from the head portion to the base portion.

In some implementations, the base portion includes one or more second rib projections for increasing frictional resistance with the cable, the second rib projections being generally parallel to the first rib projections.

In some examples, the distal end of the head portion of each of the plurality of fixation projections has a tapered or arcuate shape.

In some examples, the plurality of fixation projections includes four fixation projections.

In some implementations, the cable fixation bracket includes a bridge portion supporting a plurality of bracket structures for anchoring aramid yarn of the cable.

In some examples, the bridge portion extends from the base portion to define an open region between the base portion and the bridge portion.

In some examples, the bridge portion is a u-shaped structure.

In some examples, the cable fixation device is a unitarily formed component.

In one implementation, the plurality of bracket structures are offset from the plurality of fixation projections such that openings between the bracket structures are aligned with the fixation projections.

In some examples, each of the plurality of bracket structures includes a main body extending orthogonally away from the bridge portion and a nose projection extending orthogonally away from the main body.

In some examples, the main body of each of the plurality of bracket structures further includes a latch portion located on a first side of the main body, wherein the latch portion is for retaining an aramid yarn termination unit. The latch portion can include a ramped portion for facilitated insertion of an aramid yarn termination unit and a shoulder portion for retaining an inserted aramid yarn termination unit.

In one implementation, the base portion includes an opening through the base portion adjacent a second side of the main body of each of the plurality of bracket structures, wherein the opening is for receiving a post of the aramid yarn termination unit.

In some examples, the base portion extends between a pair of mounting structures with openings for receiving mounting bolts.

In one aspect, the disclosure includes a method of anchoring a cable to a cable fixation bracket.

In one implementation, the method includes removing a jacket portion of a fiber optic cable to expose aramid yarn of the cable and an optical fiber cable and aligning the fiber optic cable with a fixation projection of the cable fixation.

In one example, the aramid yarn is wrapped about a bracket structure of the cable fixation device and routed back along a jacketed portion of the fiber optic cable aligned with the fixation projection.

In one example, the aramid yarn is wrapped about an aramid yarn termination unit and the termination unit is mounted to a pair of bracket structures of the cable fixation bracket.

In some examples, the aramid yarn and the jacketed portion of the fiber optic cable are secured to the fixation projection with a cable tie.

In some examples, the method is repeated to secure a plurality of fiber optic cables to multiple cable fixation projections in a spaced apart relationship.

In some examples, a sleeve or wrap to the fiber optic cable is added to the cable at the location where the fiber optic cable is secured to the fixation projection by the cable tie.

In one aspect of the disclosure, a cable fixation projection is presented that includes a first extension portion extending in a first direction from a first base portion to a first head portion, wherein the first extension portion is tapered and further includes a second extension portion extending in a second direction opposite the first direction from a second base portion to a second head portion, wherein the second extension portion is tapered.

In some examples, the first extension portion is tapered in a direction from the first base portion to the first head portion and the second extension portion is tapered in a direction from the second base portion to the second head portion.

In some examples, the first extension portion is tapered in a direction from the first head portion to the first base portion and the second extension portion is tapered in a direction from the second head portion to the second base portion.

In another aspect of the disclosure, a cable fixation projection is disclosed having a main body having a mounting surface, a first pair of slots, and a second pair of slots. The first pair of slots can extend through the main body, wherein each of the first pair of slots is disposed at a first obtuse angle relative to the other, the first pair of slots being for receiving a first cable tie for securing a cable against the mounting surface. The second pair of slots can extend through the main body, wherein each of the second pair of slots is disposed at a second obtuse angle relative to the other, the second pair of slots being for receiving a second cable tie for securing the cable against the mounting surface.

In some examples, one the first pair of slots tapers towards the other of the first pair of slots in a first direction and wherein one of the second pair of slots tapers towards the other of the second pair of slots in a second direction opposite the first direction.

In some examples, the first pair of slots tapers towards the second pair of slots.

In some examples, the first pair of slots diverges away from the second pair of slots.

A variety of additional aspects will be set forth in the description that follows. The aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
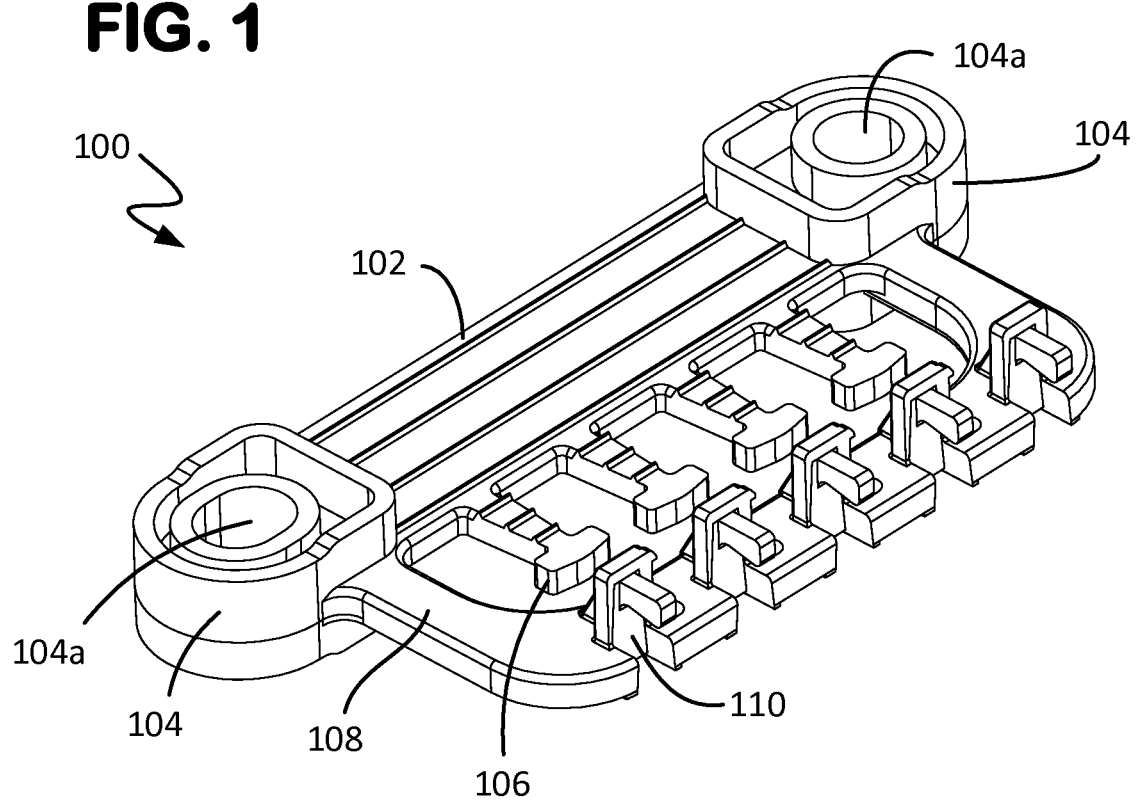
FIG. 1 is a top perspective view of a cable fixation device having features in accordance with the present disclosure.
Figure 2:
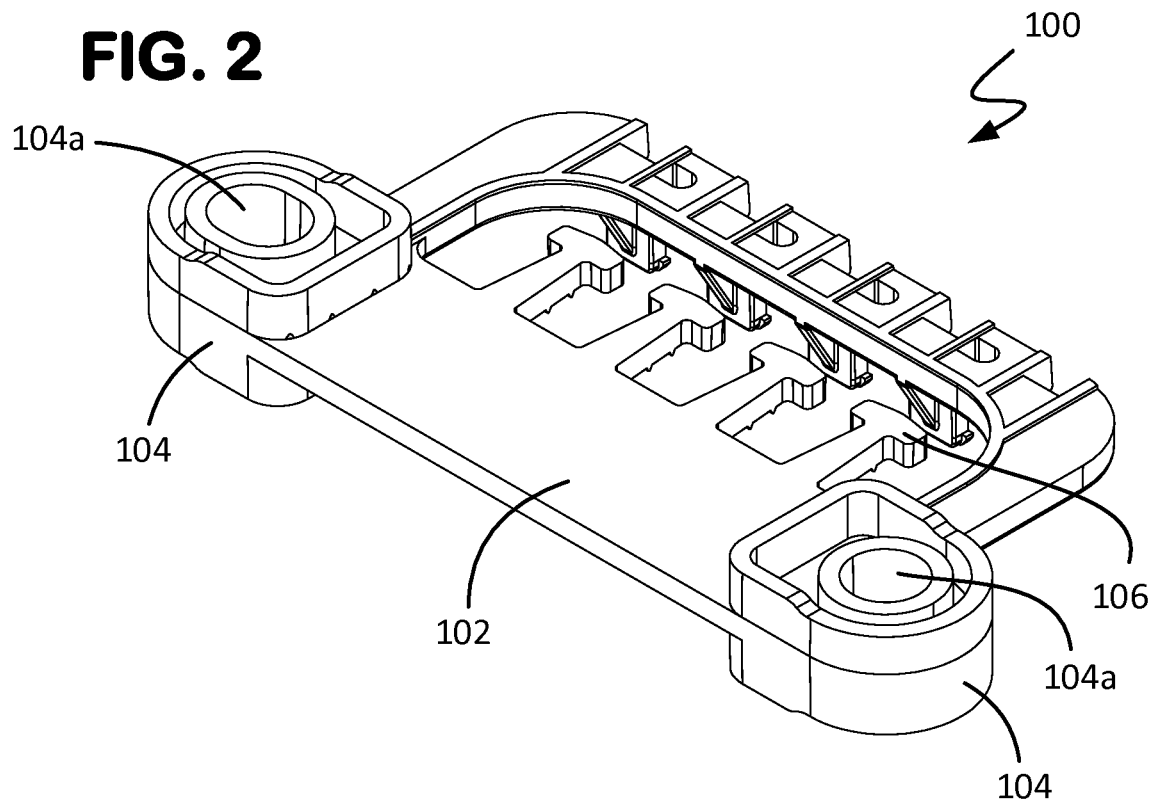
FIG. 2 is a bottom perspective view of the cable fixation device shown in FIG. 1.
Figure 3:
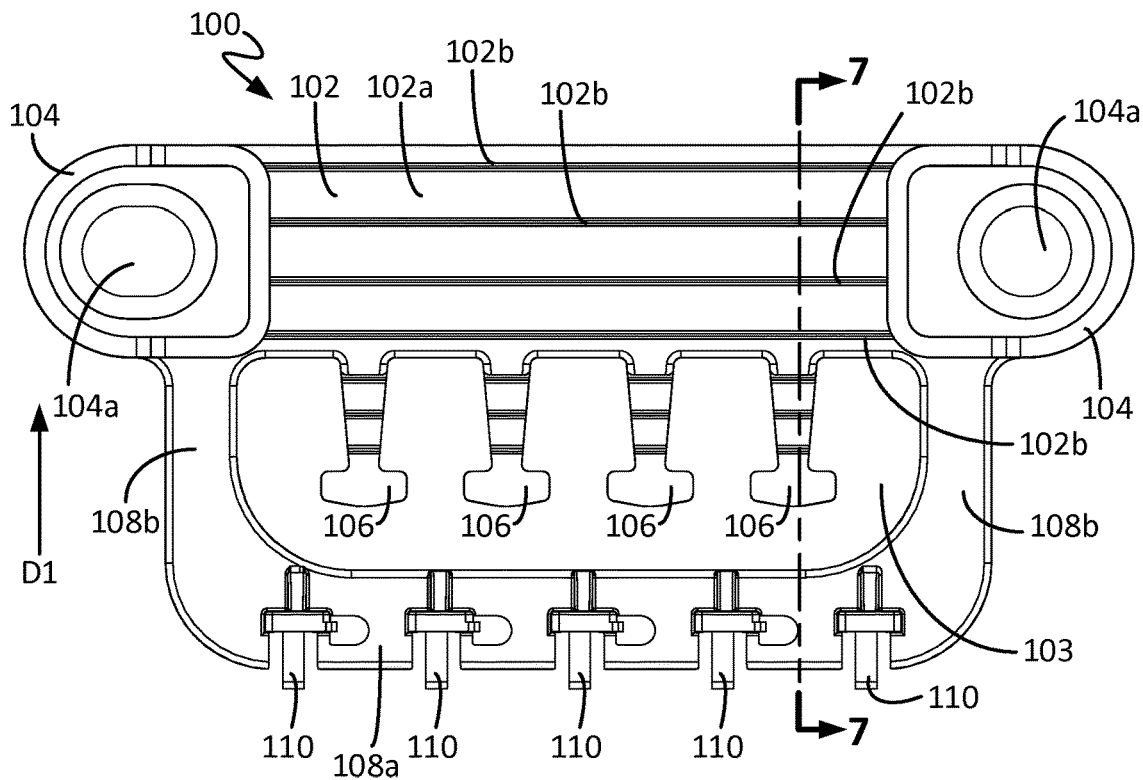
FIG. 3 is a top view of the cable fixation device shown in FIG. 1.
Figure 4:
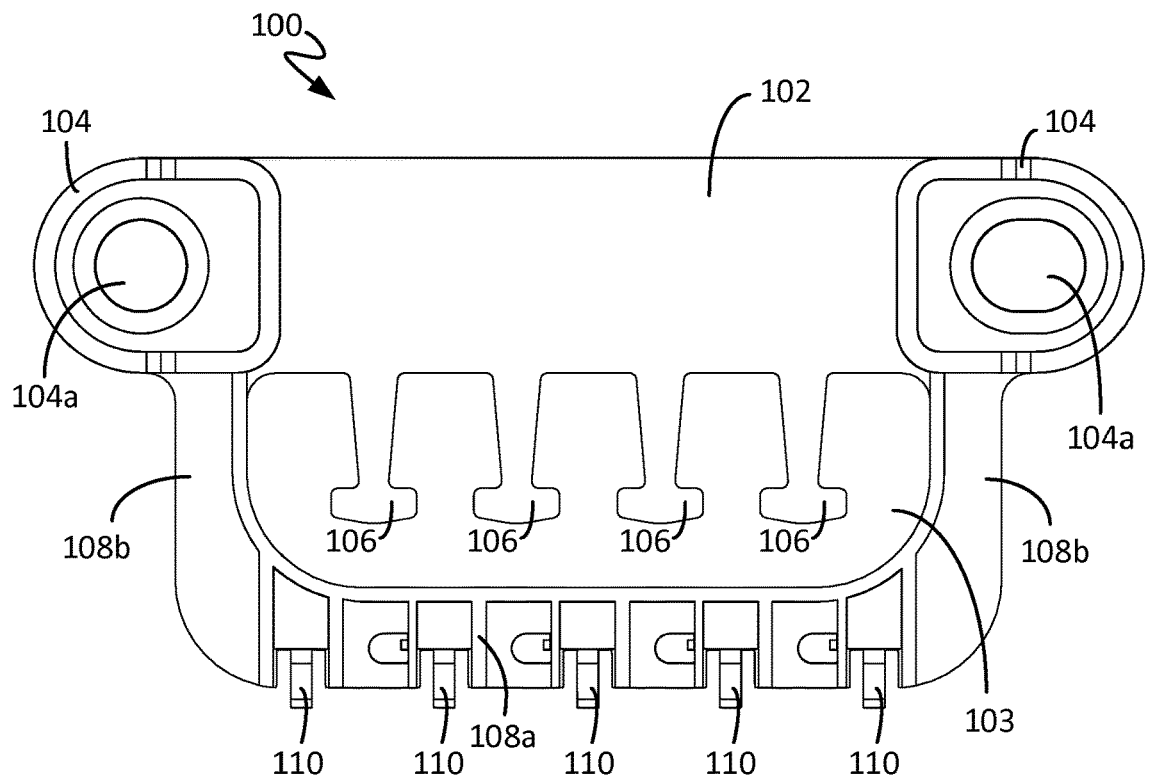
FIG. 4 is a bottom view of the cable fixation device shown in FIG. 1.
Figure 5:
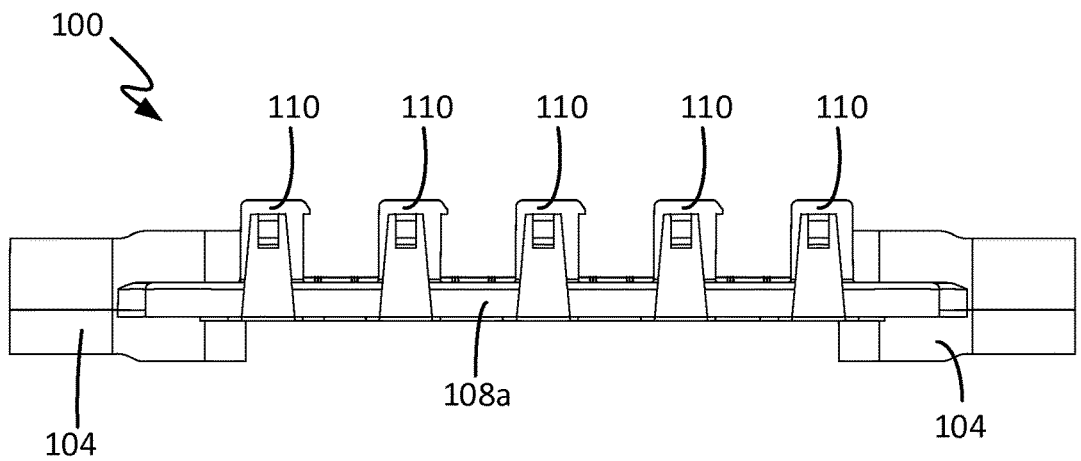
FIG. 5 is a front view of the cable fixation device shown in FIG. 1.
Figure 6:
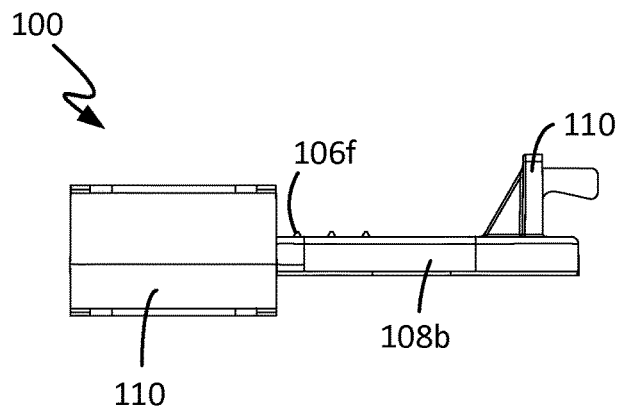
FIG. 6 is a side view of the cable fixation device shown in FIG. 1.
Figure 7:
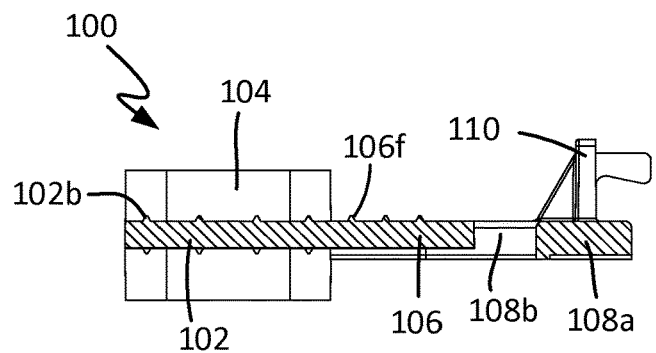
FIG. 7 is a cross-sectional view of the cable fixation device shown in FIG. 1, taken along the line, 7-7 shown in FIG. 3.
Figure 8:
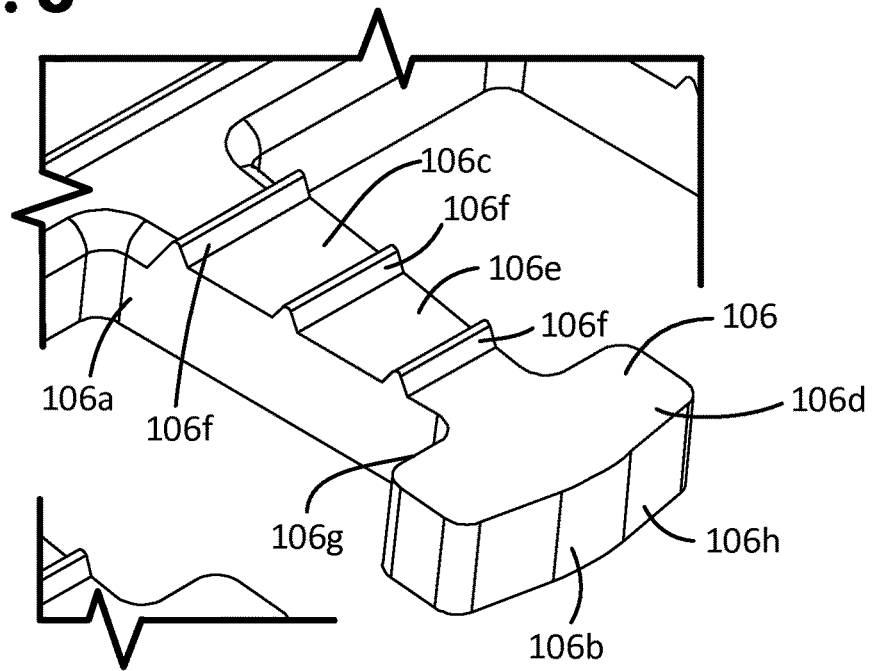
FIG. 8 is an enlarged front perspective view of one of the fixation projections of the cable fixation device shown in FIG. 1.
Figure 9:
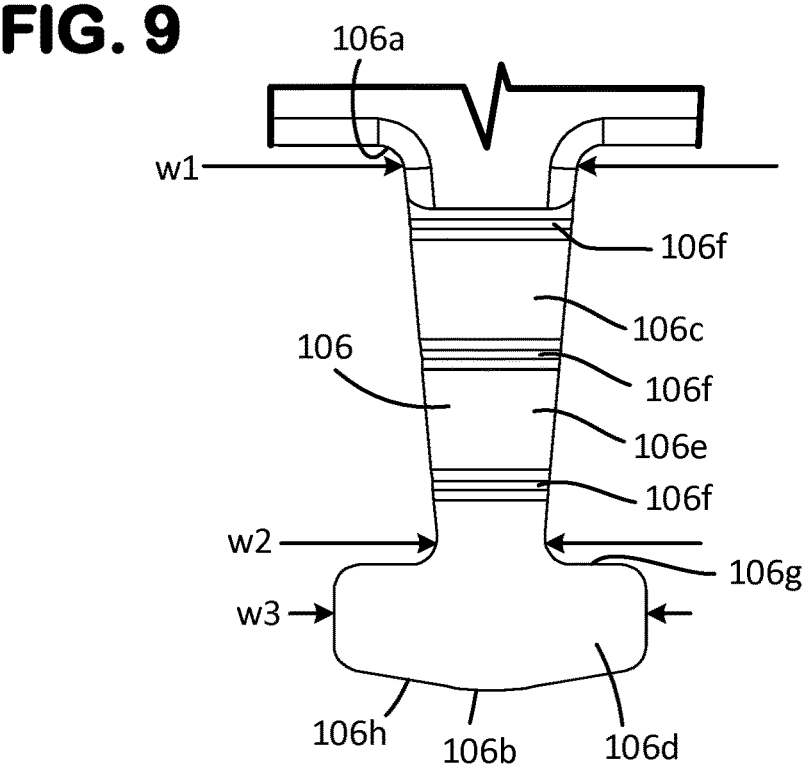
FIG. 9 is a top view of the fixation projection shown in FIG. 8.
Figure 10:
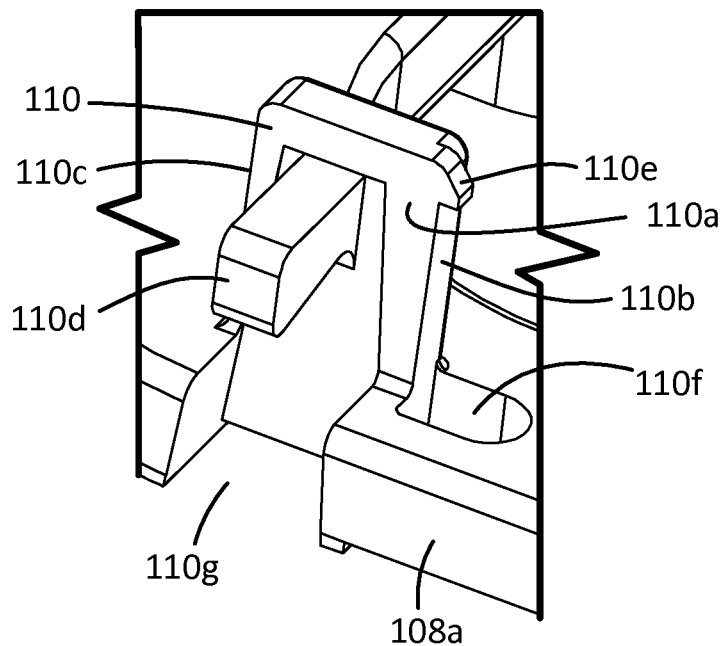
FIG. 10 is an enlarged front perspective view of one of the bracket structures of the cable fixation device shown in FIG. 1.
Figure 11:
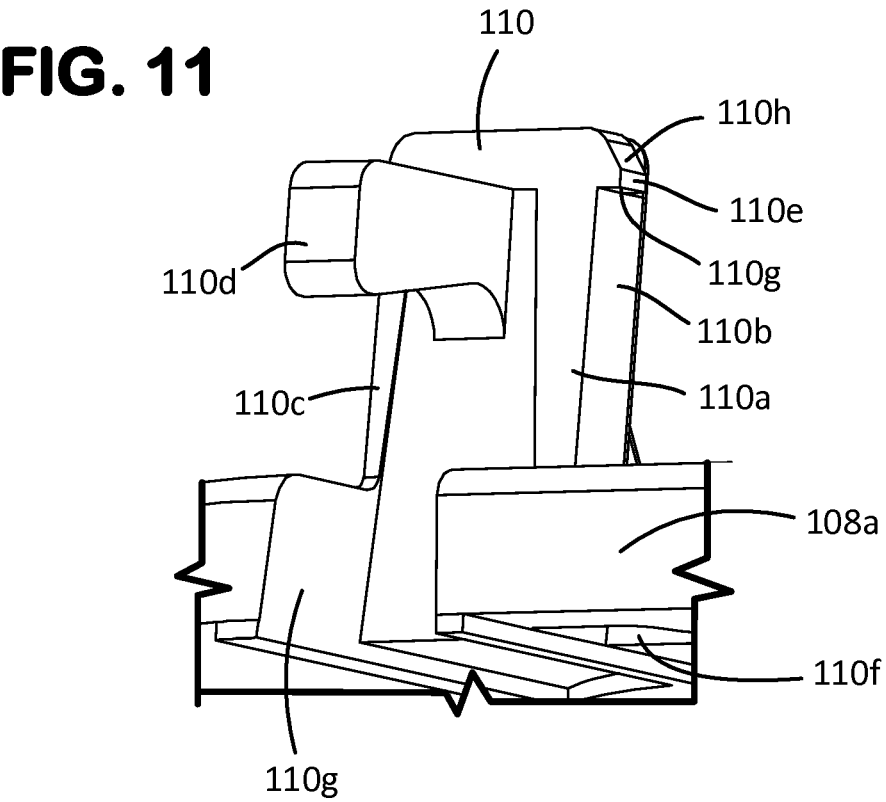
FIG. 11 is a rear perspective view of the bracket structures shown in FIG. 10.

Various examples will be described in detail with reference to the drawings, wherein like reference numerals represent like parts and assemblies throughout the several views. Reference to various examples does not limit the scope of the claims attached hereto. Additionally, any examples set forth in this specification are not intended to be limiting and merely set forth some of the many possible examples for the appended claims. Referring to the drawings wherein like reference numbers correspond to like or similar components throughout the several figures.

Figure 25:
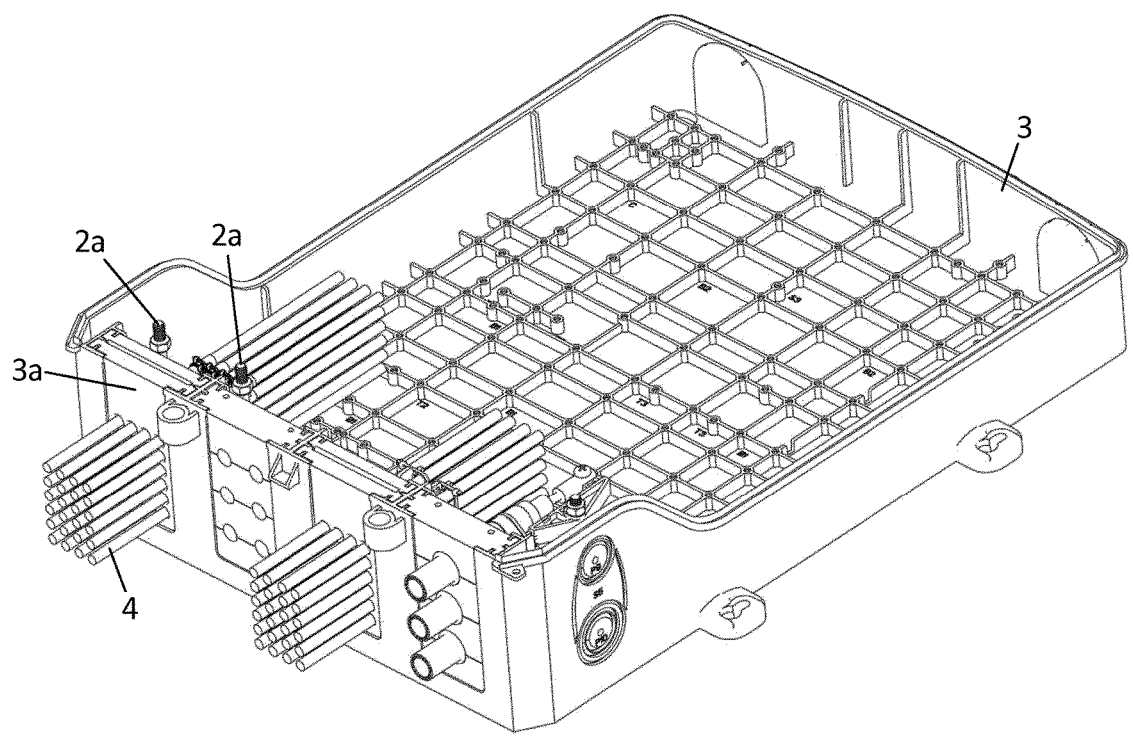
FIG. 25 is a perspective view of an enclosure within which a plurality of the cable fixation devices shown in FIG. 1 can be installed.
Figure 26:
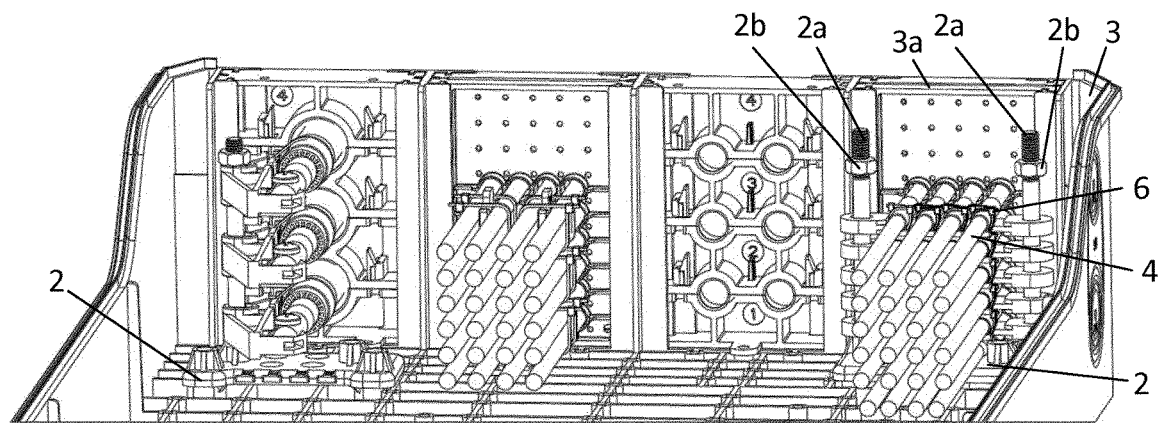
FIG. 26 is a partial perspective view of the enclosure shown at FIG. 25.

A stackable cable fixation bracket 100 is disclosed. In the example shown, the cable fixation bracket 100 is unitarily formed from a single material, such as a polymeric material. The stackable cable fixation bracket(s) 10 can be mounted to a base element 2 of an enclosure of the type shown and described in PCT International Application Publication WO 2015/091865 entitled Cable Fixation Devices and Methods and filed on Dec. 18, 2014, the entirety of which is incorporated by reference herein. Referring to FIGS. 25 and 26, a suitable enclosure 3 is shown in which cables 4 pass through cable seals 3a and are then mounted to stacked cable fixation brackets that are mounted to a pair of projections 2a (e.g. threaded bolts) and secured by fasteners 2b (e.g. threaded nuts). The projections 2a are secured to a base member 2, which is in turn mounted to the enclosure 3. The cable fixation brackets 100 disclosed herein can be mounted to the projections 2a shown at FIGS. 25 and 26 and used to secure the shown cables 4.

As presented, the cable fixation bracket 100 includes a base portion 102 extending between a pair of mounting structures 104 having a central aperture 104a. The central apertures 104a receive the projections 2a extending from the base element 2 within the enclosure such that the cable fixation brackets 100 can be stacked together in a secured manner within the enclosure 3.

In one aspect, the base portion 102 includes a cable mounting surface 102a upon which a plurality of spaced apart rib projections 102b are disposed. As shown, the rib projections 102b extend along the length of the base portion 102. The rib projections 102b aid in securement of the cables attached to the cable fixation brackets 100 by providing increased frictional resistance.

The cable fixation bracket 100 also includes a plurality of spaced apart fixation projections 106. In the example shown, four fixation projections 106 are shown. However, more or fewer fixation projections 106 may be provided. In one aspect, each fixation projection 106 extends generally orthogonally from the base 102 from a first end 106a proximate the base 102 to a second end 106b remote from the base 102. In one aspect, each fixation projection 106 includes an extension portion 106c and a head portion 106d connected to the extension portion 106c.

The extension portion 106c has a first width w1 at the first end 106a and a second width w2 at the junction point between the extension portion 106c and the head portion 106d (i.e. at the opposite end of the extension portion 106c). In the example shown, the first width w1 is greater than the second width w2 such that the extension portion 106c has a tapered shape. When a cable tie 6, discussed later, is attached to the extension portion 106c to secure a cable 4 to the fixation bracket, a pulling force on the cable 4 in a direction D1 from the second end 106b to the first end 106a of the fixation projection will cause the cable tie 6 to also move in the direction D1. As the extension portion 106c increases in width in the direction D1, the cable tie 6 will self-tighten against the extension portion 106c as it is pulled against the increasingly wider extension portion 106c to further secure the cable 4 in position.

In one aspect, the extension portion 106c includes a mounting surface 106e upon which a plurality of spaced apart rib projections 106f are disposed. In the example shown, three rib projections 106f extend orthogonally to the pulling direction D1 and parallel to the rib projections 102b. However, fewer or more rib projections 106f may be utilized. The rib projections 106f provide frictional resistance to the cable 4 against movement in the pulling direction D1 which is enhanced by the tightening force caused by the cable tie 6 securing the cable to the extension portion 106c.

As shown, the head portion 106d of each fixation projection 106 has a width w3 that is wider than the width w2. This greater width allows the head portion 106d to retain the cable tie 6 onto the fixation projection 106 once the cable tie 6 has been secured to the extension portion 106c. The head portion 106d has a first end 106g where the head portion 106d meets the extension portion 106c that extends generally orthogonally to the pulling direction D1. This geometry enhances the ability of the head portion 106d to retain the cable tie 6 onto the fixation projection 106. The head portion 106d extends to a second end 106h coincident with the fixation projection second end 106b. At this end, the head portion 106d is provided with a tapered profile such that the second end 106g slopes or angles towards the first end 106a from the longitudinal axis of the fixation projection 106. This tapered profile allows the cable 4 ties to more easily slide past the head portions 106d and into the interstitial spaces between the extension portions 106c during installation of the cable ties 6.

The cable fixation bracket 100 is also shown as being provided with a bridge portion 108 that extends between the mounting structures 104 in a u-shape. The bridge portion 108 includes a central portion 108a extending between a pair of legs 108b connected to the mounting structures 104. In one aspect, the central portion 108a extends in a direction that is parallel to the base portion 102. In one aspect, the legs 108b have a length such that the central portion 108a is spaced away from the fixation projections 106 such that an open region 103 is bounded by the base portion 102, the central portion 108a, and the legs 108b. As shown, the fixation projections 106 extend within the open region 103.

A plurality of bracket structures 110 are shown as being disposed in a spaced relationship on the central portion 108a of the bridge portion 108. The bracket structures 110 are configured to act as an anchor point for the aramid yarn 4a of the cables 4 or to receive and retain an aramid yarn termination unit 112, discussed later. In one aspect, the bracket structures 110 are offset from the fixation projections 106 such that the cable fiber 4b can extend between the bracket structures 110 or such that the aramid yarn termination unit 112 can be aligned with and receive the cable 4 attached to the fixation projection 106.

As shown, each bracket structure 110 includes a main body 110a extending orthogonally away from the central portion 108a. Each main body 110a also extends between a first side 110b and a second side 110c. A nose portion 110d extends from the main body 110a in the same direction the fixation projections 106 extend from the base portion 102. In the example shown, the central portion 108a includes a recessed area adjacent the main body 110a and below the nose portion 110d. The main body 110a and nose portion 110d provide anchor points about which the aramid yarn 4a of an attached cable 4 can be wrapped, as explained in further detail later.

In one aspect, adjacent main bodies 110a are spaced apart such that the first side 102b of one main body 110a and the second side 102c of the adjacent main body 110a can slidingly receive channels 112c of the aramid yarn termination units 112. The disclosed termination units 112 include a post member 112d which is received by an opening 110f in the central portion 108a of the bridge portion 108 when the termination unit 112 is slid between the bracket structures 110. On the opposite side of the location of the post member 112d, the main body 110a includes a recess for receiving the post 112d of another termination unit 112 such that they multiple termination units can be arranged in a stacked configuration. Each bracket structure 110 is also provided with a latch portion 110e with a shoulder portion that snaps over the main body 112a of the termination unit 112 once the termination unit 112 has been sufficiently received between the main bodies 110a of the adjacent bracket structures 110. Once the latch portion 110e snaps over the main body 112a of the termination unit 112, the termination unit 112 is securely fastened to the cable fixation bracket 100 by the shoulder portion 110g of the latch. The latch portion 110e can also be provided with a ramped portion 110h to facilitate deflection of the latch portion 110e itself, the main body 110a, and/or the termination unit 112 during insertion of the termination unit 112 so that the termination unit 112 can be inserted past the latch portion 110e. In the embodiment shown, five spaced apart mounting brackets 110 are provided such that four termination units 112 can be mounted to the cable fixation bracket 100 in alignment with the four fixation projections 106.

Figure 12:
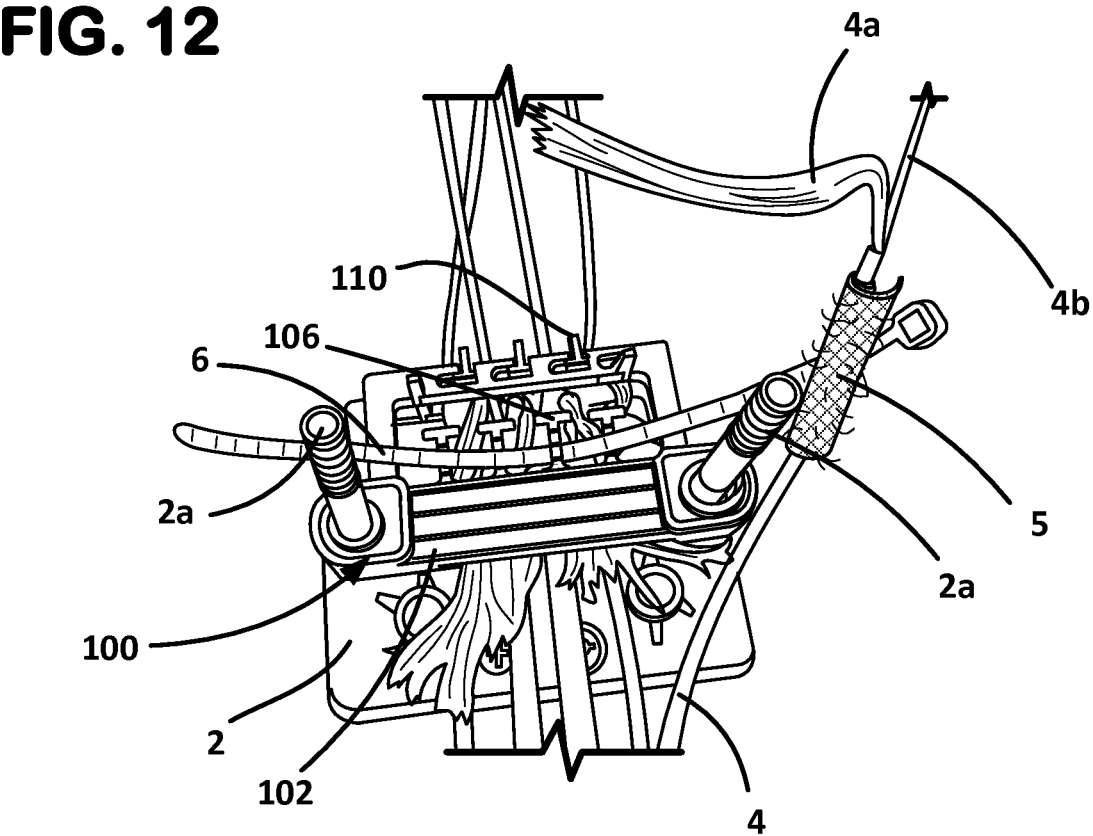
FIG. 12 is a perspective view showing completion of a first step in a process for securing a cable to a cable fixation device of the type shown in FIG. 1.
Figure 13:
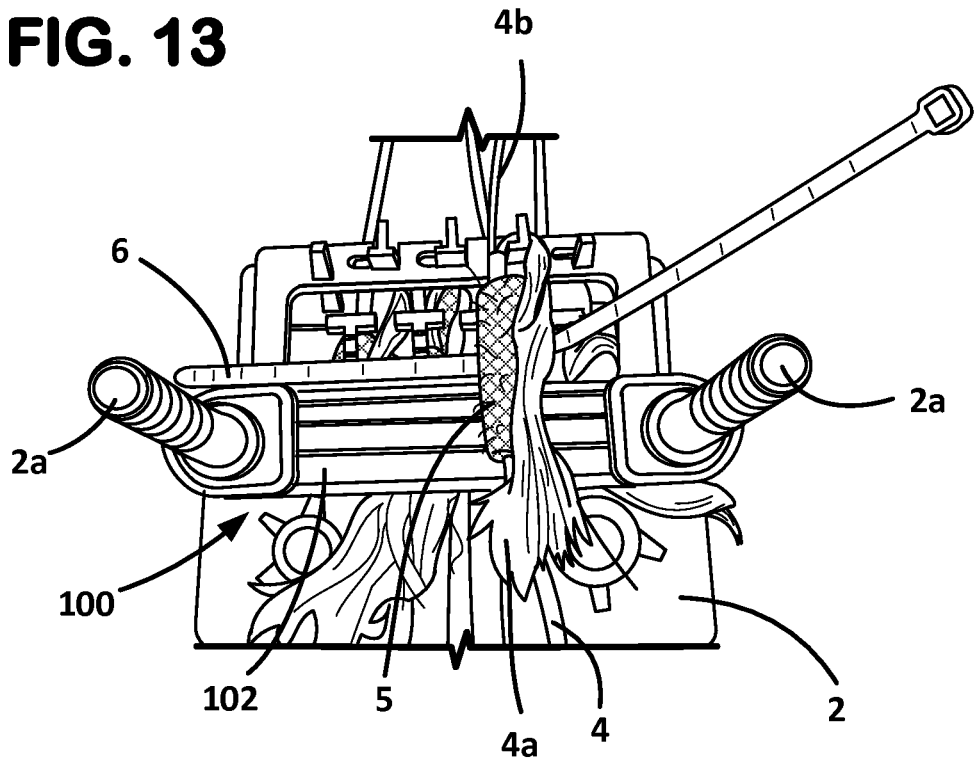
FIG. 13 is a perspective view showing completion of a second step in a process for securing the cable to the cable fixation device shown in FIG. 12.
Figure 14:
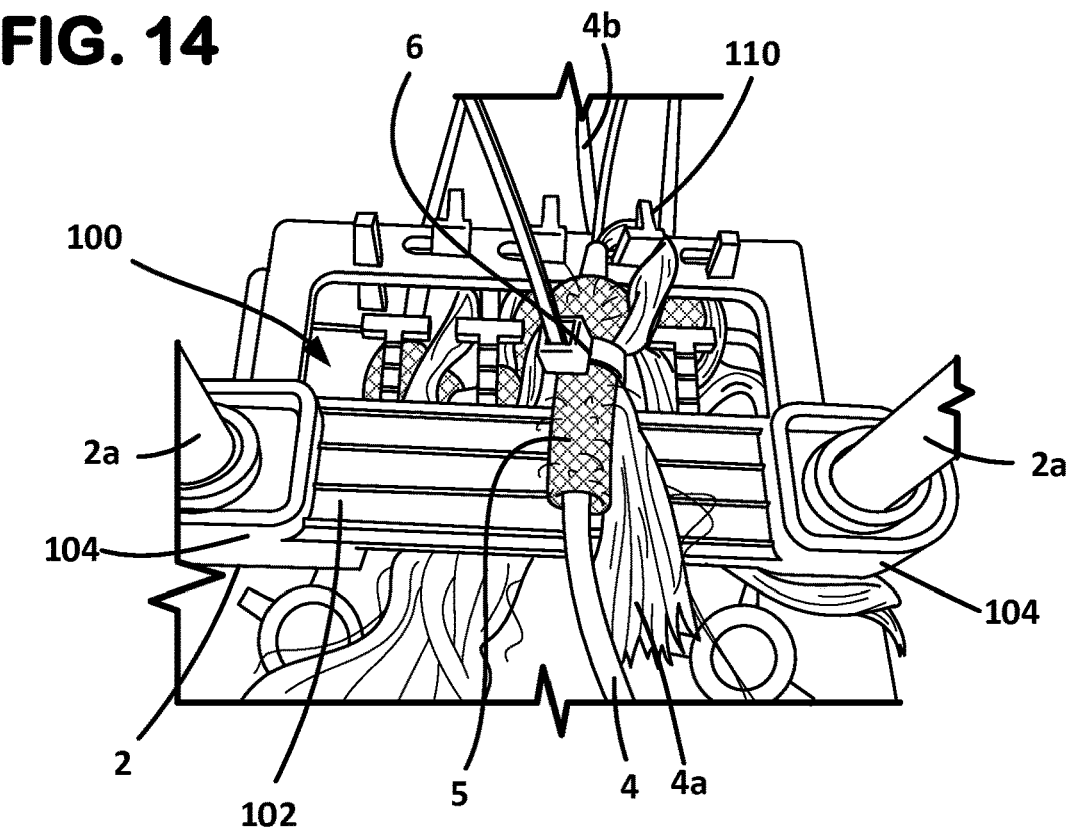
FIG. 14 is a perspective view showing completion of a third step in a process for securing the cable to the cable fixation device shown in FIG. 12.
Figure 15:
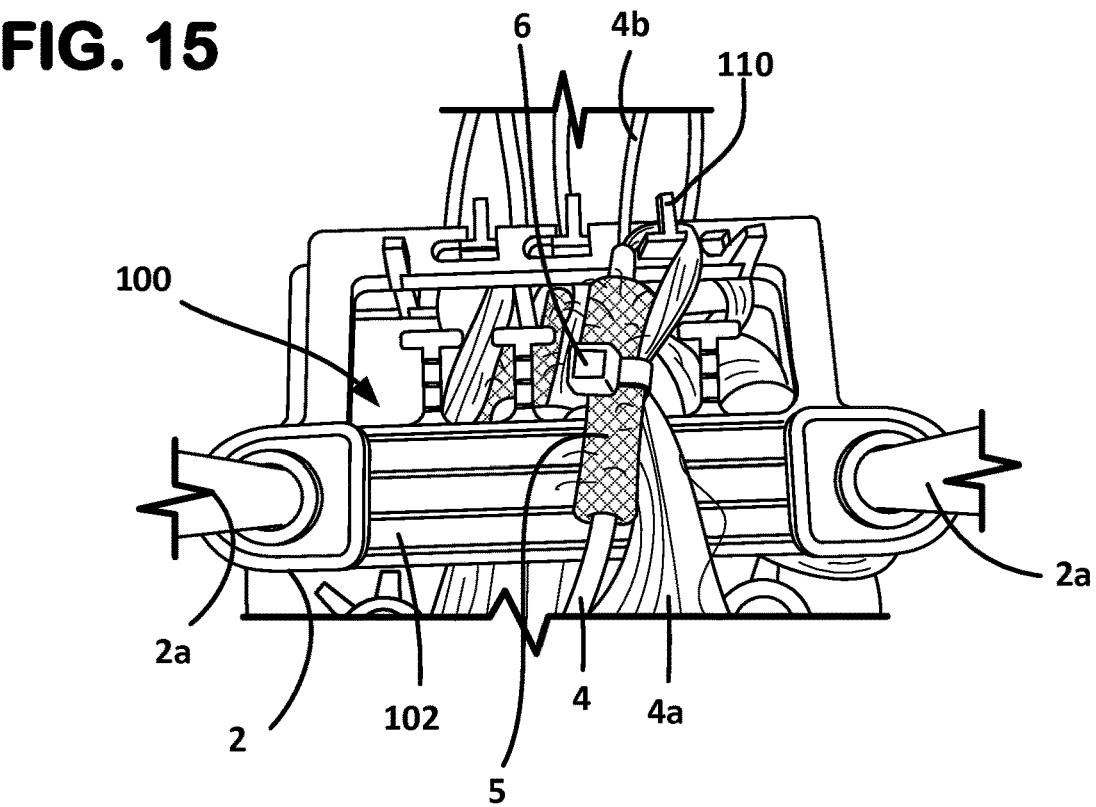
FIG. 15 is a perspective view showing completion of a fourth step in a process for securing the cable to the cable fixation device shown in FIG. 12.

Referring to FIGS. 12 to 15, the cable fixation bracket 100 is shown in various states of installation of a cable 4 in a configuration in which the aramid yarn 4a from the cable is wrapped about the bracket structures 110 rather than utilizing an aramid yarn fixation unit 112. In FIG. 12, an unsecured cable tie 6 is installed beneath a fixation projection 106 and above the adjacent fixation projections 106. Also in FIG. 12, it can be seen that an sleeve or wrap 5 has been affixed to the cable 4. In one example, the sleeve or wrap 5 is a Velcro wrap. The sleeve or wrap 5 adds thickness to the cable 4 and also frictionally engages with the rib projections 106f. In FIG. 13, the cable 4 and sleeve or wrap 5 are laid atop a fixation bracket 106 and the aramid yarn 4a is wrapped once around (e.g. 180 degrees) a bracket structure 110 and back towards the sleeve or wrap 5 and parallel to the cable 4. The nose portion 110d of the bracket structure 110 prevents the aramid yarn 4a wrapped about the main body 110a from lifting up and over the main body 110a. In FIG. 14, the cable tie 6 is closed and tightened against both the cable 4 and the aramid yarn 4a returning from the bracket structure 110. FIG. 15 shows the cable tie 6 with the excess tail portion removed, thus resulting in a fully installed application. Although the aramid yarn 4a is shown as being wrapped once about the main body 110a of the bracket structure 110, the aramid yarn 4a can be wrapped multiple times around the main body 110a and/or around the nose portion 110d of the bracket structure 110 before returning to the cable tie 6. Once installed, any tension exerted on the cable 4 will result in the aramid yarn 4a and cable tie 6 acting as a strain relief to protect the cable 4.

Figure 16:
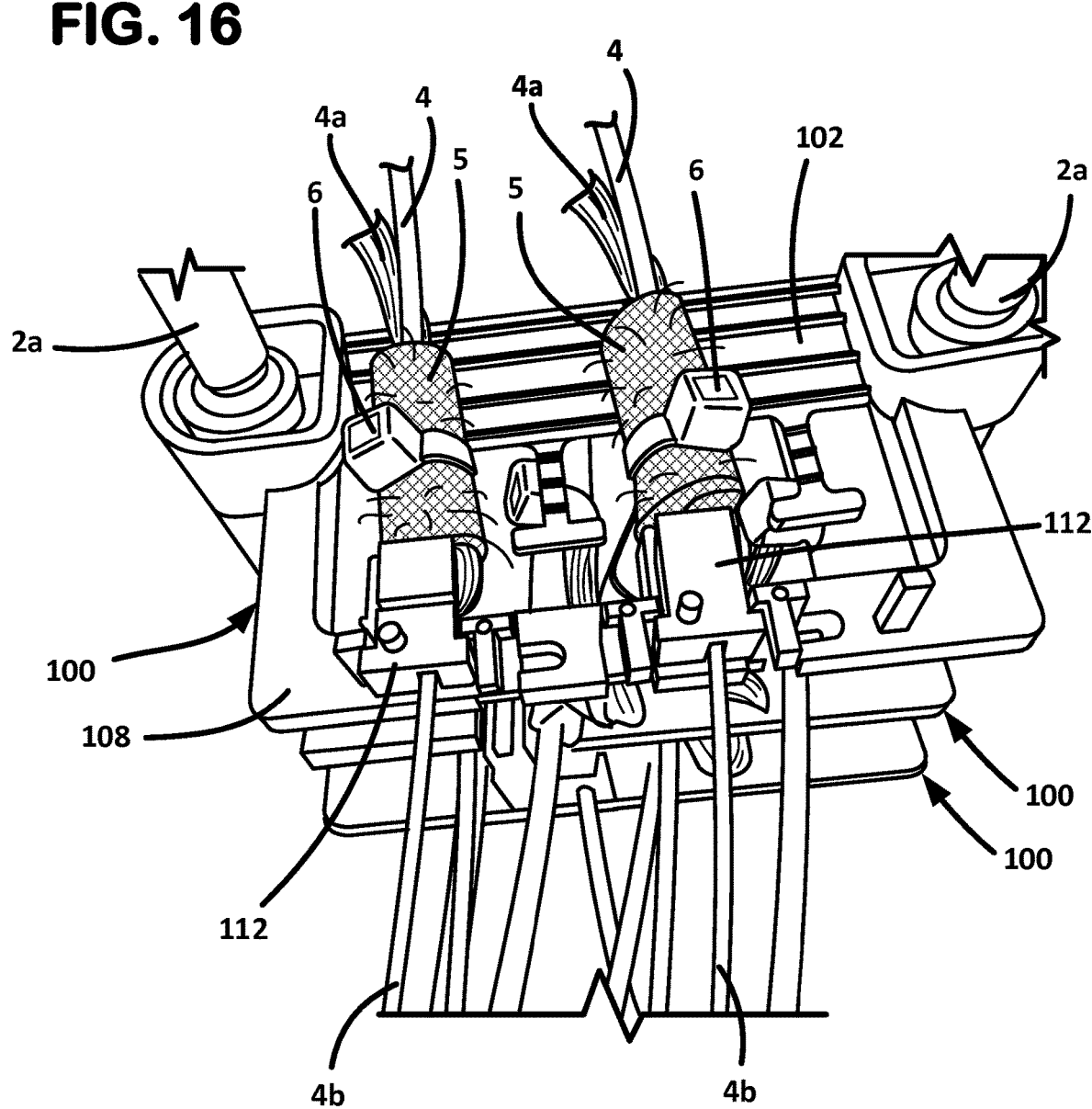
FIG. 16 is a perspective view showing cables attached to a cable fixation device of the type shown in FIG. 1, wherein each of the cables are secured to a stackable aramid yarn termination unit.
Figure 17:
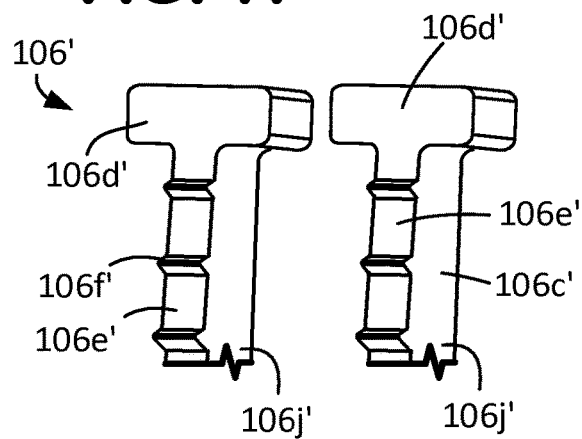
FIG. 17 is a front perspective view of an alternate cable fixation projection design usable with the cable fixation device shown in FIG. 1.
Figure 18:
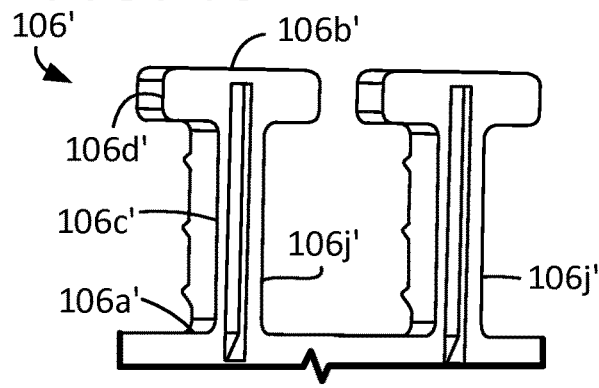
FIG. 18 is a rear perspective view of the cable fixation projection shown in FIG. 17.
Figure 19:
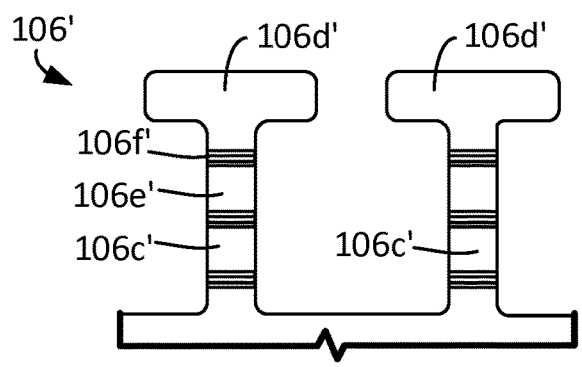
FIG. 19 is a front view of the cable fixation projection shown in FIG. 17.
Figure 20:
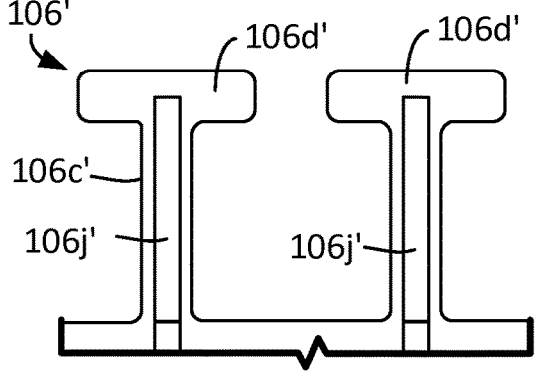
FIG. 20 is a rear view of the cable fixation projection shown in FIG. 17.

Referring to FIG. 16, the cable fixation bracket 100 is shown utilizing aramid yarn fixation units 112 attached to the bracket structures 110 instead of relying on the aramid yarn 4a being wrapped about the bracket structures 110. As shown, the aramid yarn 4a leaving the fixation units 112 is still routed back along the cable 4 and sleeve or wrap 5, where the yarn 4a, cable 4, and sleeve or wrap 5 are secured to the fixation projection 106 via the cable tie 6. However, the excess aramid yarn 4a can be cut such that it is not secured by the cable tie 6.

Figure 21:
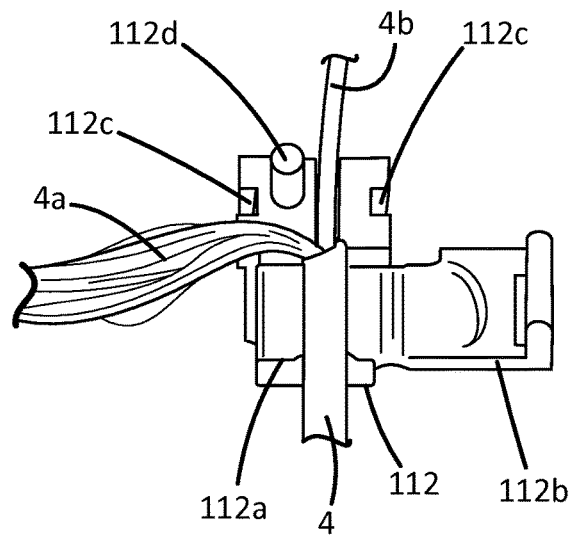
FIG. 21 is a perspective view of one of the cables and aramid yarn termination units shown in FIG. 20, showing the cable yarn and termination unit after completion of a first installation step.
Figure 22:
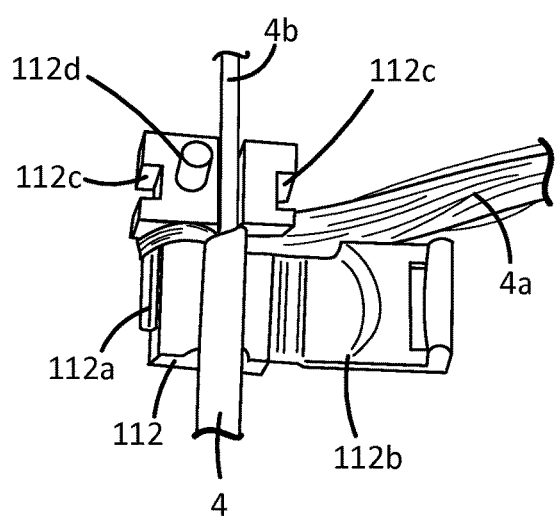
FIG. 22 is a perspective view of the cable and aramid yarn termination unit shown in FIG. 21, showing the cable yarn and termination unit after completion of a second installation step.
Figure 23:
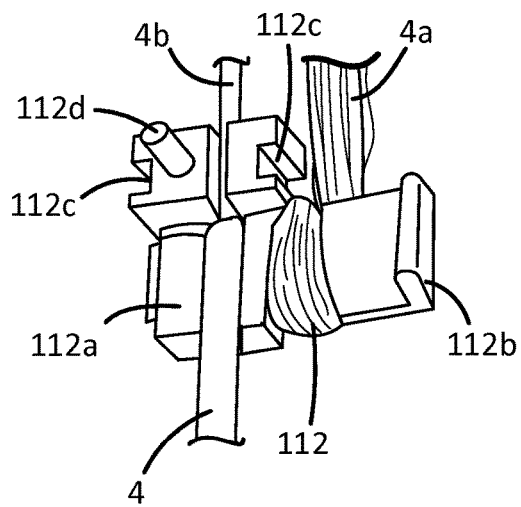
FIG. 23 is a perspective view of the cable and aramid yarn termination unit shown in FIG. 21, showing the cable yarn and termination unit after completion of a third installation step.
Figure 24:
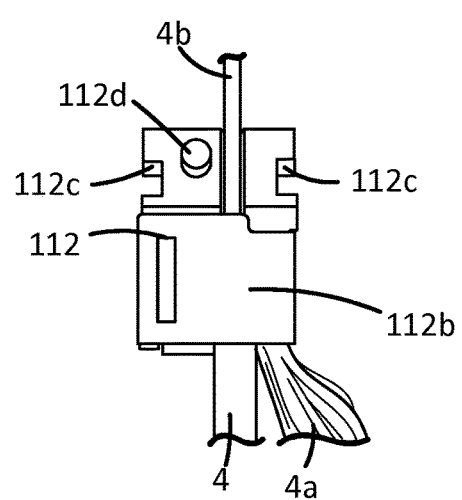
FIG. 24 is a perspective view of the cable and aramid yarn termination unit shown in FIG. 21, showing the cable yarn and termination unit after completion of a fourth installation step.

FIGS. 21 to 24 show the assembly of an exemplary aramid yarn fixation unit 112. In FIG. 21, a stripped cable 4 is laid within a main body 112a and the yarn 4a is laid to one side of the main body 112a. In FIG. 22, the yarn 4a is wrapped about the main body 112a. In FIG. 23, the yarn 4a is further wrapped about main body 112a and/or the hinge area in a direction orthogonal to the initial wrapping about the main body 112a. In FIG. 24, a door 112b is shown as being closed over the wrapped yarn 4a in a snap-fit arrangement with the main body 112a. As shown, the hinge area between the main body 112a and the door 112b is a living hinge. FIG. 24 also shows the yarn 4a extending out of the fixation unit 112 in a direction along the cable 4 with the cable fiber 4b extending in the opposite direction out of the fixation unit 112. In FIG. 24, the channels 112c which receive the sides of the mounting structure main bodies 110a are most easily viewed.

Referring to FIGS. 17 to 20, an alternative design for a fixation projection 106' is presented. The fixation projections 106' have an extension portion 106c that has a generally constant width and thickness. However, a tapered rib 106f' is provided on the bottom side of each fixation projection 106 that tapers in a direction from the first end 106a' to the second end 106b'. As the resulting overall dimension of the fixation projection 106 increases in a direction toward the first end 106a', the tapered rib 106f' enables the fixation projection 106' to have the same self-tightening functionality as the tapered fixation projections 106. The fixation projections 106' are also provided with a non-tapered or generally squared head portion 106d'. FIGS. 12-16 show the use of the fixation projections 106'.

Referring to FIGS. 27 to 34 further alternative designs for fixation projections 206, 306, 406, 506 usable in conjunction with the disclosed cable fixation brackets are disclosed. In contrast to the previously described fixation projections 106, 106', the fixation projections 206 to 506 enable for cable ties to be tightened onto cables when the cable is pulled from either direction.

Figure 27:
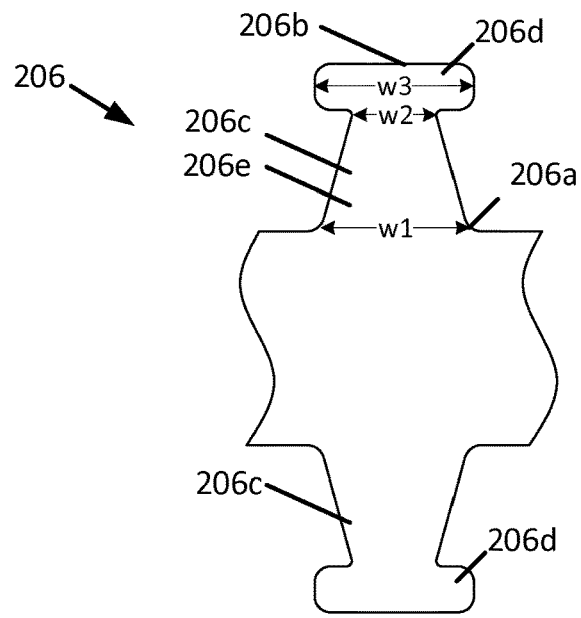
FIG. 27 is a top view of an alternate cable fixation projection design usable with the cable fixation device shown in FIG. 1.
Figure 28:
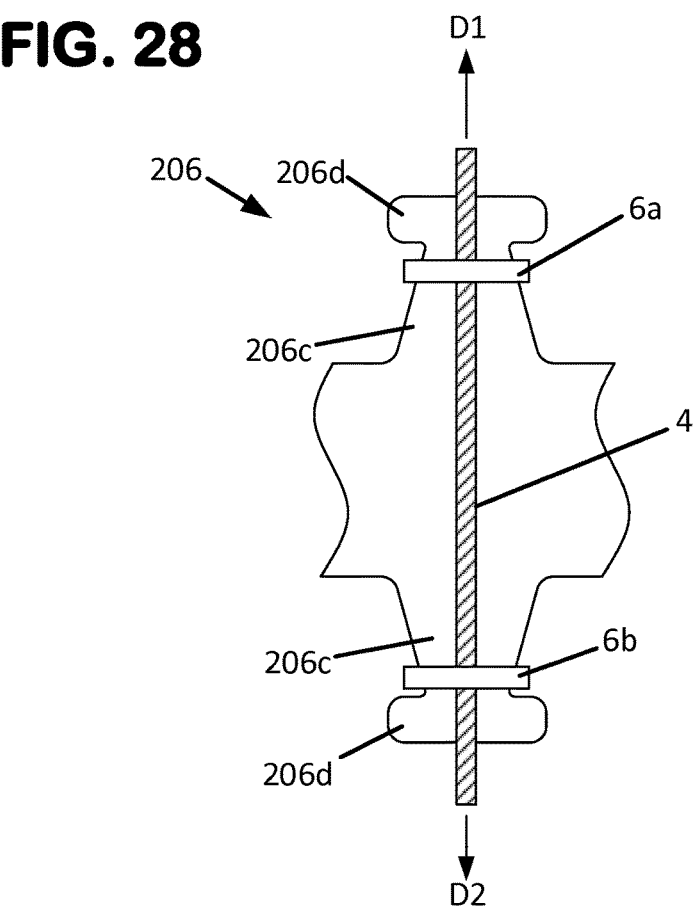
FIG. 28 is a top view of the cable fixation projection shown in FIG. 27, with a cable attached to the cable fixation projection.

For the embodiment 206 shown at FIGS. 27 and 28, this dual direction tightening features is accomplished by providing two oppositely arranged tapered extension portions 206c. Each of the extension portions 206c has a first width w1 at a first end 206a and a second width w2 at the junction point between the extension portion 206c and the head portion 206d (i.e. at the opposite end of the extension portion 206c). In the example shown, the first width w1 is greater than the second width w2 such that the extension portion 206c has a tapered shape. When a cable tie 6b is attached to one of the extension portions 106c to secure a cable 4 to the fixation bracket, as shown at FIG. 28, a pulling or pushing force on the cable 4 in a direction D1 will cause the cable tie 6b to also move in the direction D1. As the extension portion 206c increases in width in the direction D1, the cable tie 6b will self-tighten against the extension portion 206c as it is pulled against the increasingly wider extension portion 206c to further secure the cable 4 in position. A second cable tie 6a attached to the other extension portion 206c self-tightens similarly when the cable is pulled or pushed in a direction D2 opposite the direction D1. Accordingly, the configuration presented at FIGS. 27 and 28 provides for a dual direction self-tightening arrangement.

Figure 29:
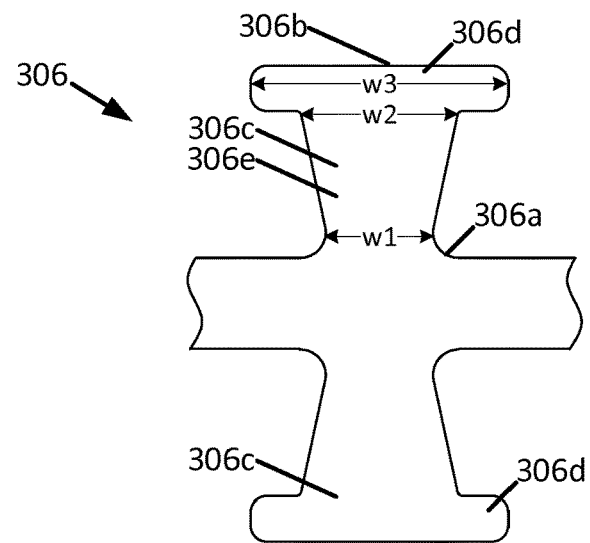
FIG. 29 is a top view of an alternate cable fixation projection design usable with the cable fixation device shown in FIG. 1.
Figure 30:
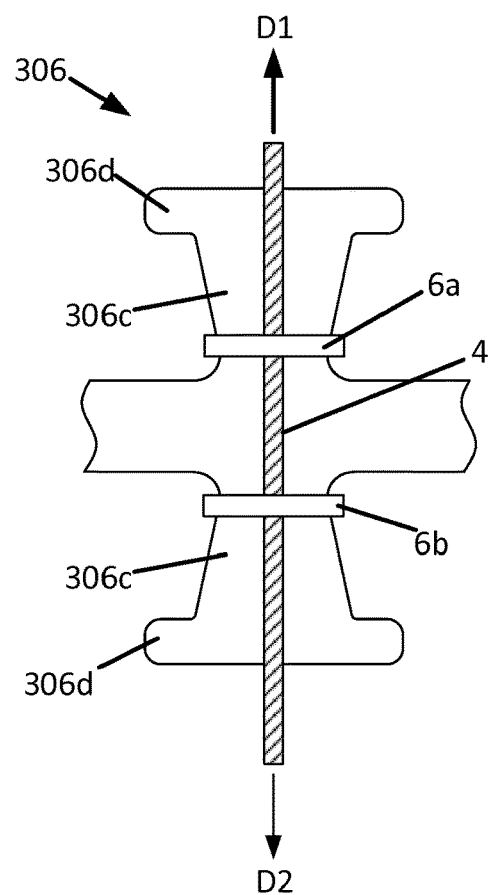
FIG. 30 is a top view of the cable fixation projection shown in FIG. 29, with a cable attached to the cable fixation projection.

The embodiment 306 shown at FIGS. 29 and 30 is similar to that shown at FIGS. 27 and 28, but is different in that the extension portions 306c taper in the opposite direction such that w2 has a greater dimension than w1. Accordingly, as the cable 4 is pulled in the direction D1, the cable tie 6a will self-tighten against the extension portion 306c to which it is attached to further secure the cable 4. Likewise, as the cable 4 is pulled in the direction D2, the cable tie 6b will self-tighten against the extension portion 306 to which it is attached to further secure the cable. Accordingly, the configuration presented at FIGS. 29 and 30 provides for a dual direction self-tightening arrangement.

Figure 31:
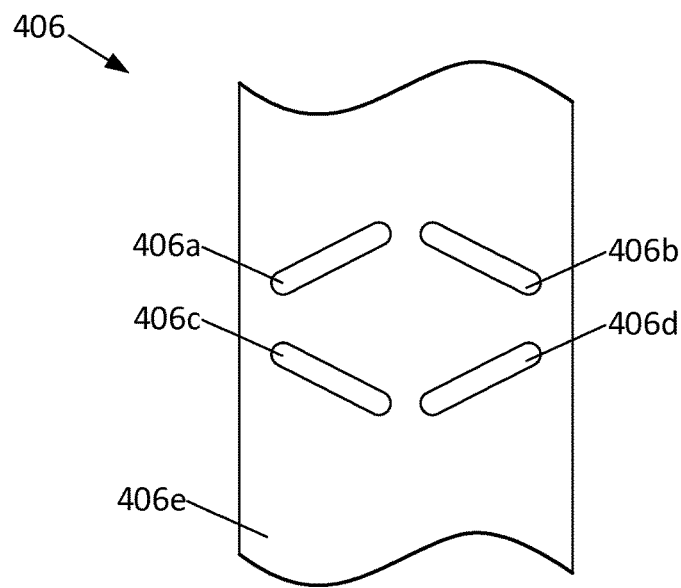
FIG. 31 is a top view of an alternate cable fixation projection design usable with the cable fixation device shown in FIG. 1.
Figure 32:
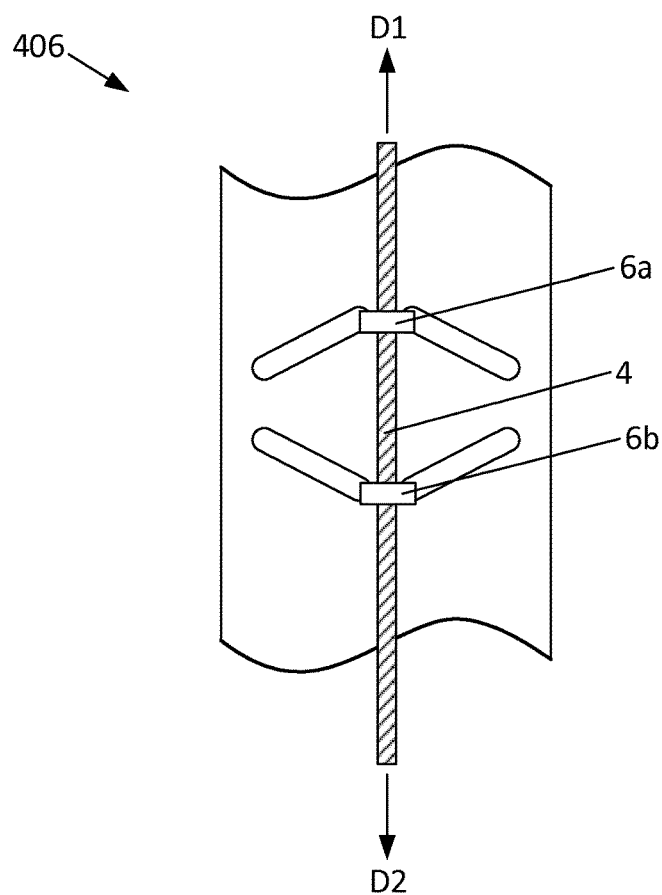
FIG. 32 is a top view of the cable fixation projection shown in FIG. 31, with a cable attached to the cable fixation projection.

The embodiment 406 shown at FIGS. 31 to 32 utilizes a different concept in which two pairs of opposing and oppositely arranged angled slots 406a/406b and 406c/406d are provided in the main body of the fixation projection 406. As shown, the first pair of slots 406a/406b are angled with respect to each other such that they taper in the direction D1 while the second pair of slots 406c/406d are angled with respect to each other such that they taper in the direction D1. In the example presented, the slots have an obtuse angle of about 120 degrees between them such that each is angled about 60 degrees from a longitudinal axis of the fixation projection 406. Other angles are possible. As shown at FIG. 32, a first cable tie 6a can be passed through the first pair of slots 406a/406b and a second cable tie 6b can be passed through the second pair of slots 406c/406d to secure the cable 4 against the mounting surface 406e of the cable fixation projection 406. When a pulling force in a direction D1 on the cable 4 exists, the cable tie 6b will be expanded by the diverging slots 406c/406d and resultantly self-tighten against the cable 4. Similarly, when a pulling force in a direction D2 on the cable 4 exists, the cable tie 6a will be expanded by the diverging slots 406a/406b and resultantly self-tighten against the cable 4. Accordingly, the configuration presented at FIGS. 31 and 32 provides for a dual direction self-tightening arrangement.

Figure 33:
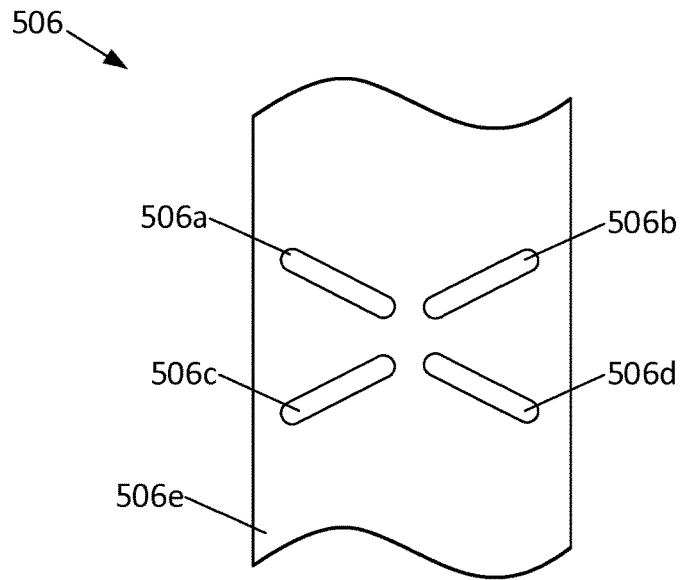
FIG. 33 is a top view of an alternate cable fixation projection design usable with the cable fixation device shown in FIG. 1.
Figure 34:
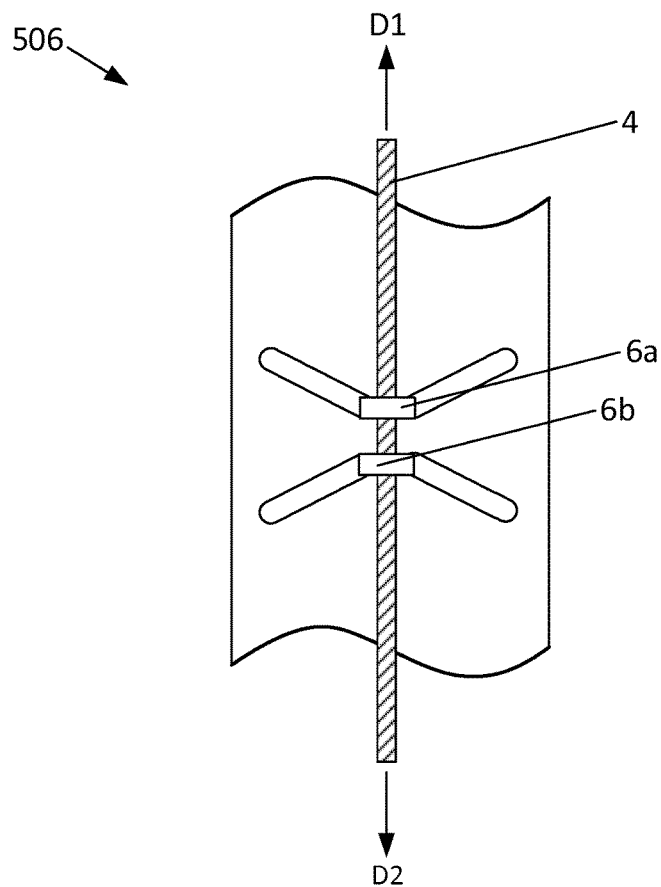
FIG. 34 is a top view of the cable fixation projection shown in FIG. 33, with a cable attached to the cable fixation projection.

The embodiment 506 shown at FIGS. 33 and 34 is similar to that shown at FIGS. 31 and 32, but is different in that the pairs of slots 506a/506b and 506c/506d are oriented in the opposite direction such that they diverge as they extend towards the ends of the fixation projection 506. Accordingly, as the cable 4 is pulled in the direction D1, the cable tie 6a will self-tighten against the diverging slots 506a/506b. Likewise, as the cable 4 is pulled in the direction D2, the cable tie 6b will self-tighten against the diverging slots 506c/506d. Accordingly, the configuration presented at FIGS. 33 and 34 provides for a dual direction self-tightening arrangement.

From the forgoing detailed description, it will be evident that modifications and variations can be made in the aspects of the disclosure without departing from the spirit or scope of the aspects. While the best modes for carrying out the many aspects of the present teachings have been described in detail, those familiar with the art to which these teachings relate will recognize various alternative aspects for practicing the present teachings that are within the scope of the appended claims.

What is claimed is:

1. A cable fixation bracket for anchoring a cable comprising:
   a) a base portion extending between a first end and a second end;
   b) a plurality of cable fixation projections extending orthogonally from the base portion, each of the cable fixation projections being configured to support a cable at an extension portion; and
   c) a u-shaped bridge portion extending from the base portion to define an open region between the base portion and the bridge portion, wherein the extension portions of the cable fixation projections extend into the open region;
   d) wherein the bridge portion includes a plurality of bracket structures for anchoring aramid yarn of the cable.

2. The cable fixation bracket according to claim 1, wherein the extension portions taper in a widthwise direction.

3. The cable fixation bracket according to claim 1, wherein the extension portions taper in thickness.

4. The cable fixation bracket according to claim 1, wherein each of the plurality of cable fixation projections includes one or more first rib projections for increasing frictional resistance with the cable in a direction from a head portion to the base portion.

5. The cable fixation bracket according to claim 4, wherein the base portion includes one or more second rib projections for increasing frictional resistance with the cable, the second rib projections being generally parallel to the first rib projections.

6. The cable fixation bracket according to claim 1, wherein a distal end of a head portion of each of the plurality of cable fixation projections has a tapered or arcuate shape.

7. The cable fixation bracket according to claim 1, wherein the plurality of cable fixation projections includes four cable fixation projections.

8. The cable fixation bracket according to claim 1, wherein the plurality of bracket structures are offset from the plurality of cable fixation projections such that openings between the bracket structures are aligned with the cable fixation projections.

9. The cable fixation bracket according to claim 1, wherein each of the plurality of bracket structures includes a main body extending orthogonally away from the bridge portion and a nose projection extending orthogonally away from the main body.

10. The cable fixation bracket according to claim 9, wherein the main body of each of the plurality of bracket structures further includes a latch portion located on a first side of the main body, the latch portion being for retaining an aramid yarn termination unit.

11. The cable fixation bracket according to claim 10, wherein the base portion includes an opening through the base portion adjacent a second side of the main body of each of the plurality of bracket structures, the opening being for receiving a post of the aramid yarn termination unit.

12. The cable fixation bracket according to claim 11, wherein the base portion extends between a pair of mounting structures with openings for receiving mounting bolts.

13. The cable fixation bracket according to claim 1, wherein each of the cable fixation projections is one of:
   a t-shaped projection including an extension portion and a head portion, wherein the extension portion tapers to have a decreased dimension in a direction from the base portion towards the head portion, and
   a projection including an extension portion with at least one pair of diverging slots extending through the extension portion.

14. A secured cable system comprising:
   a. a plurality of cables, each including a jacket, aramid yarn, and an optical fiber cable; and
   b. a cable fixation bracket for anchoring the plurality of cables comprising:
      i. a base portion extending between a first end and a second end; and ii. a plurality of t-shaped cable fixation projections extending orthogonally from the base portion, each of the cable fixation projections supporting one of the plurality of cables, wherein each of the cable fixation projections includes an extension portion and a head portion, wherein the extension portion tapers to have a decreased dimension in a direction from the base portion towards the head portion;

iii. a plurality of cable ties, wherein each cable is secured to one of the plurality of cable fixation projections by one of the plurality of cable ties wrapped about the extension portion of the respective cable fixation projection; and iv. a bridge portion supporting a plurality of bracket structures for selectively anchoring the aramid yarn of one of the plurality of cables or receiving an aramid yarn termination unit which secures the aramid yarn of one of the plurality of cables, the bridge portion extending from the base portion to define an open region between the base portion and the bridge portion.

15. The secured cable system according to claim 14, wherein each cable further secures the aramid yarn of the cable.

16. The secured cable system according to claim 14, wherein a sleeve is provided for each cable at the location where the cable tie secures the cable to the extension portion of the fixation projection.

17. The secured cable system according to claim 14, wherein the plurality of bracket structures are offset from the plurality of cable fixation projections such that openings between the bracket structures are aligned with the cable fixation projections.

18. The secured cable system according to claim 14, wherein each of the plurality of bracket structures includes a main body extending orthogonally away from the bridge portion and a nose projection extending orthogonally away from the main body, wherein the aramid yarn of each cable is wrapped about one of the plurality of bracket structures.

19. The secured cable system according to claim 18, wherein the aramid yarn is wrapped about the nose projection.

20. The secured cable system according to claim 18, wherein an aramid yarn termination unit is mounted to adjacent main bodies of the plurality of bracket structures.

21. The secured cable system according to claim 20, wherein the main body of each of the plurality of bracket structures includes a latch portion located on a first side of the main body for securing the aramid termination unit to the main body.

22. A cable fixation bracket for anchoring a cable comprising:
a) a base portion extending between a first end and a second end;
b) a plurality of cable fixation projections extending orthogonally from the base portion, each of the cable fixation projections being configured to support a cable having an aramid yarn; and
c) a plurality of bracket structures for anchoring the aramid yarn of the cable, the plurality of bracket structures being spaced from the plurality of cable fixation projections;
d) wherein the base portion, the plurality of cable fixation projections, and the plurality of bracket structures are portions of a unitarily formed component.

23. The cable fixation bracket of claim 22, wherein the plurality of bracket structures are supported by a bridge portion extending from the base portion.

24. The cable fixation bracket of claim 23, wherein the bridge portion has a u-shape defining an open region between the bridge portion and the base portion.

25. The cable fixation bracket of claim 23, wherein the plurality of bracket structures are offset from the plurality of cable fixation projections such that openings between the bracket structures are aligned with the cable fixation projections.

* * * * *